Patented Apr. 10, 1923.

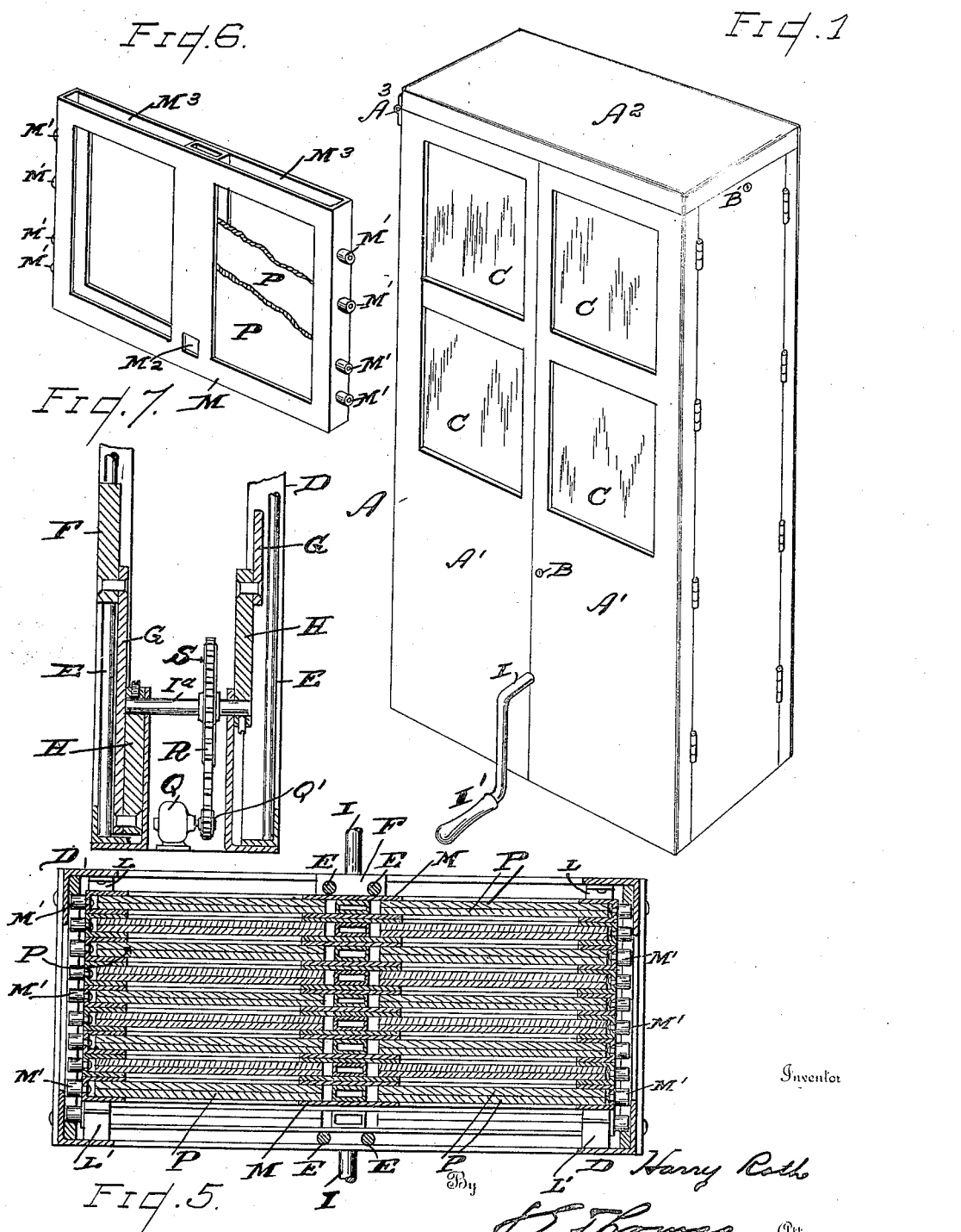

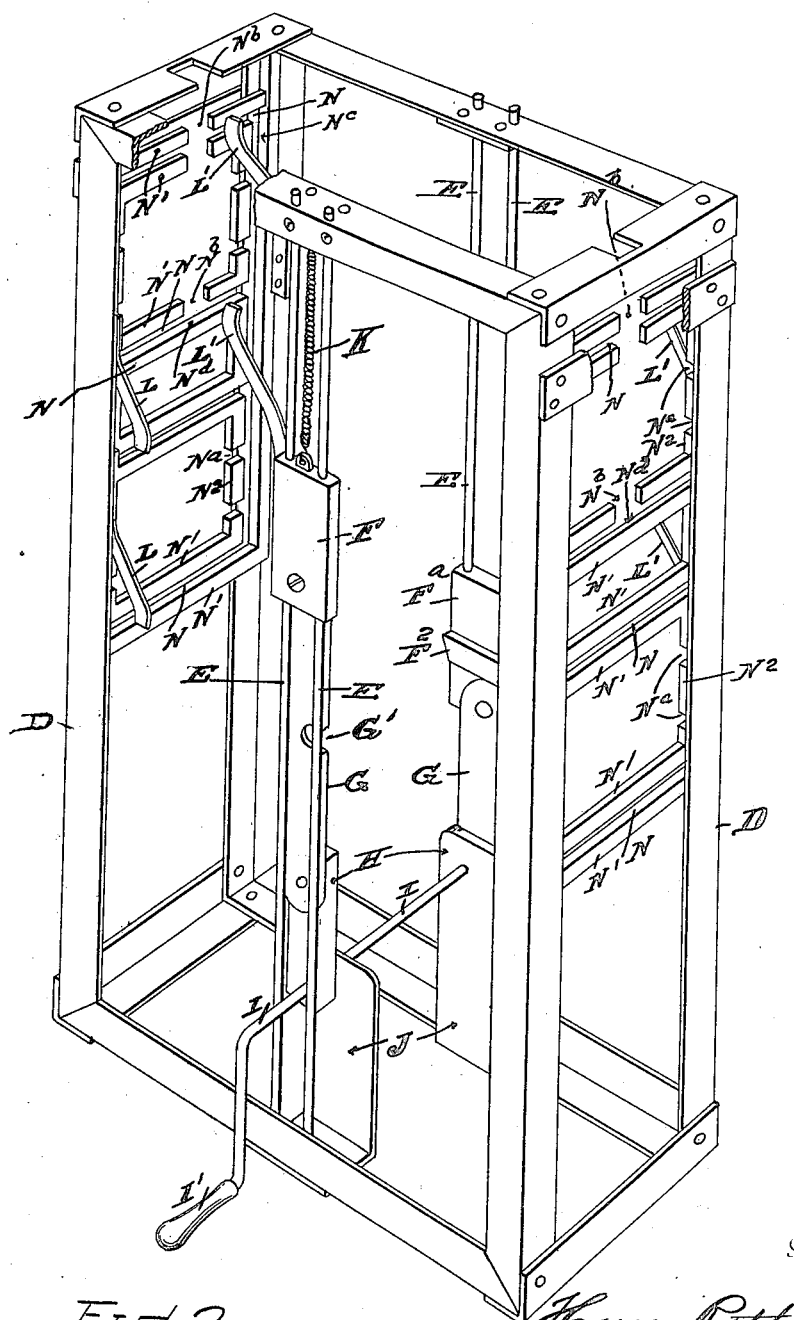

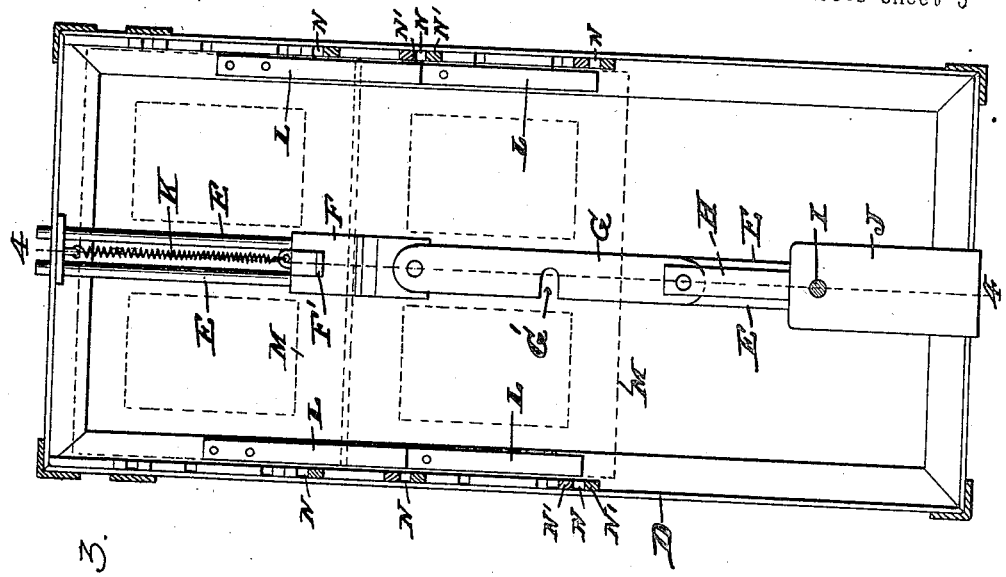
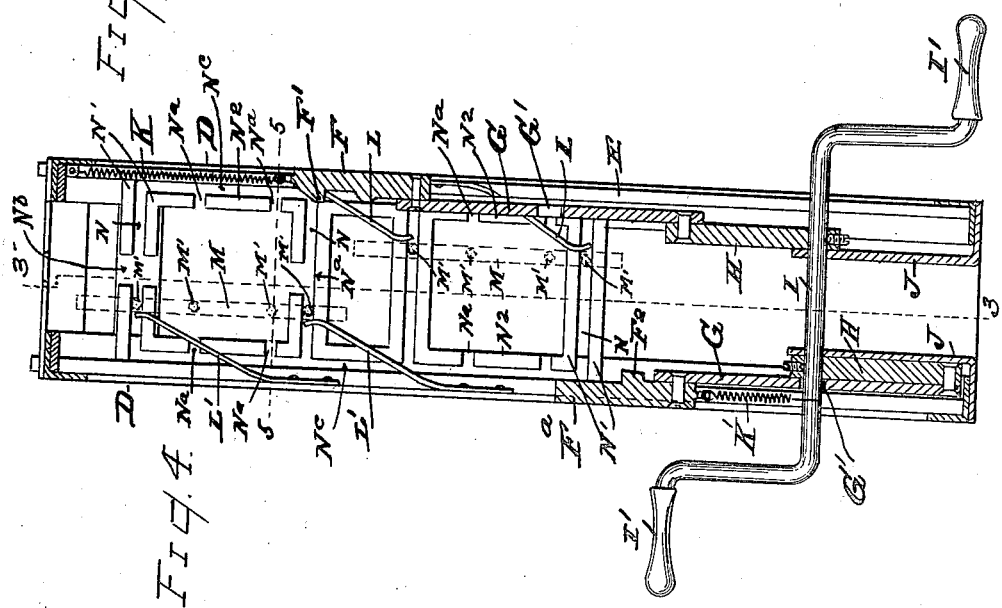

1,451,029

UNITED STATES PATENT OFFICE.

HARRY ROTH, OF DETROIT, MICHIGAN.

PHOTOGRAPH-DISPLAY CABINET.

Application filed February 27, 1922. Serial No. 539,440.

*To all whom it may concern:*

Be it known that I, HARRY ROTH, a citizen of Russia, residing at Detroit, county of Wayne, State of Michigan, have invented a certain new and useful Improvement in a Photograph-Display Cabinet, and declare the following to be a full, clear, and exact description of the same, such as will enable others skilled in the art to which it pertains to make and use the same, reference being had to the accompanying drawings, which form a part of this specification.

My invention relates to a display cabinet for photographs, advertising cards, or the like.

One object of the invention is to provide a cabinet adapted to house a plurality of movable frames containing a series of photographs,—which may be interspersed with advertising cards when used for commercial purposes,—consecutively presented to view through window openings in the cabinet by manually or mechanically actuated means contained within the enclosing wall of the cabinet.

A further object of the invention is to provide a simple and inexpensive mechanism for actuating the frames containing the photographs or advertising cards and whereby the cards or photographs may be viewed from opposite sides of the cabinet—the movement of the frames being intermittent, to admit a sufficient period of time to elapse between the exhibition of each photograph or card for properly viewing the same.

A further object of the invention is to provide for readily changing any photograph or card without removing the remaining photographs or cards.

The device may be employed in homes for displaying family portraits, in which case its operating mechanism may be manually actuated. It may also be employed to advantage in photograph galleries as a means for displaying samples of photographic work, or for other general advertising purposes in store windows, in which case the mechanism may be operated by an electric motor.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a perspective view of the cabinet.

Figure 2 is a perspective view of the device removed from its enclosing case.

Figure 3 is a vertical longitudinal sectional view of the device with the enclosing case removed, taken on or about line 3—3 of Figure 4, showing the movable frames for supporting the photographs or advertising cards in dotted lines.

Figure 4 is a vertical cross-sectional view taken on or about line 4—4 of Figure 3 indicating two of the movable photograph frames in dotted lines.

Figure 5 is a horizontal sectional view taken on or about line 5—5 of Figure 4 showing the movable photograph supporting frames in position.

Figure 6 is a perspective view of one of the frames showing a fragment of two photographs placed back to back in the openings.

Figure 7 is a cross-sectional view of a modification showing the mechanism operated by an electric motor.

Referring now to the letters of reference placed upon the drawings:

A, denotes a wood or metal cabinet, fitted with doors A' A' hinged to the end walls of the cabinet and a cover $A^2$ hinged as at $A^3$,— access being thus gained to the mechanism housed therein. B, B, denotes suitable locks for securing the doors when closed and C, indicates the windows through which the photographs or advertising matter may be viewed. D, is a rectangular frame preferably formed of angle iron housed within the cabinet. E, E, are guide rods spaced apart and medially disposed between the side walls of the frame at the front and back thereof. Slidably mounted on each pair of rods are blocks F, $F^a$ connected by pitmen G with a crank arm H, extending from the crank shaft I journaled in brackets J bolted to the frame of the device. I' are handles fitted to the ends of the crank shaft for convenience in manually operating the latter. K, is a spring connected with the upper end of the slidable block F and the upper cross member of the frame, and K' is a similar spring connected with the lower end of the slidable block $F^a$ and with the crank shaft. L and L' are flat springs riveted respectively to the front and rear upright members of the frame their free ends being adapted to bear upon a plurality of photograph frames or carriers M, housed within the cabinet. The photograph carriers (see Figure 6) are constructed of sheet metal with openings on opposite sides that photographs or advertising matter may be placed back to back in the frames so they may be viewed through the windows in the front and back walls of the cabinet. The frames M are provided at each side with a plurality of anti-friction rolls M' spaced an arbitrary distance apart that they may register with the horizontal grooves N formed between the spaced bars or guide rails N' N', secured to the side members of the frame D, and the openings $N^a$, in the vertical members $N^2$ of the guide rails (see Figure 4) that the photograph carriers or frames may be shifted laterally from one side of the cabinet to the other, through the action of the springs L and L'. $N^b$ denotes openings or passages through the horizontal guide rails N' to receive the frames M when loading or unloading the device. $M^2$ is an opening in the photograph frames to receive a lug F' on the sliding block F, whereby the frame may be drawn downwardly to its lowermost position and $F^2$ is an abutment formed on the opposing sliding block $F^a$ to receive the lowermost frame adjacent to the opposite side of the device, that it may be simultaneously forced upwardly when the crank shaft is actuated. $M^3$ $M^3$ are openings in the top of the frames through which photographs or advertising cards P may be inserted.

In the modification shown in Figure 7:— Q, indicates an electric motor, its armature shaft being fitted with a sprocket wheel Q' connected by a sprocket chain R with a relatively large sprocket gear S, mounted upon the crank shaft $I^a$, journaled in the brackets J which are bolted to the frame of the cabinet.

Having now indicated the several parts by reference letters the construction and operation of the device will be readily understood:

A plurality of frames M are first filled with photographs or advertising matter, placed back to back so that each side of the frame may display a picture or advertisement, see Figure 6 of the drawings. The cover $A^2$ of the cabinet is then raised and the frames inserted one by one through the central vertical passage $N^b$ which intersects the horizontal spaced guide rails N', the lower rolls M' of the frames resting upon the "closed" guide rail $N^d$. The frame M is then pushed laterally into the vertical passage $N^c$ between the vertical members of the guide rails in order that the lug F' on the sliding block F may enter the opening $M^2$ in the frame. The crank shaft I is then given a half revolution (further rotation being prevented by the crank shaft entering the groove G' in the pitman G) thereby carrying the frame downwardly to its lowermost position where it is acted upon by the flat springs L, which forces the frame away from the slidable block F,—the rolls M' of the frame entering the horizontal grooves N between the lower spaced guide rails N', —as indicated in dotted lines in Figure 4. The crank shaft is now rocked backward to its former position to receive another frame, inserted as previously described. This operation is repeated until the space between the front and back walls of the device is filled, then upon a further operation of the crank shaft, the abutment $F^2$ projecting from the opposing slidable block $F^a$ engages the lower edge of the adjacent frame M and raises the latter through the vertical grooves $N^c$ to a position registering with the upper windows in the cabinet where it is forced into the horizontal guide grooves N by the springs L' as indicated in dotted lines in Figure 4. Additional frames may now be inserted as previously described until the upper tier of frames has one less frame than contained in the lower tier of frames,—the object being to provide a space to receive the next succeeding frame as they are successively shifted from top to bottom and back again to the top of the cabinet. As the frames are discharged from the respective slidable blocks F, the blocks are alternately returned to their initial position for another frame; the intermittent movement of the slidable blocks affording ample time to view the pictures or advertisements through the respective windows of the cabinet before another picture is presented to view.

It will be obvious however that in order to bring the pictures into view in regular sequence space must be provided in front of the window to receive the frame about to be shifted, therefore while the space between the walls of the frame is sufficient to accommodate, for example fifteen frames in each row or thirty frames altogether, only twenty-nine frames are lodged in the cabinet— thereby providing space for the intermittent movement of the entire number of frames in regular rotation.

Having thus described my invention what I claim is:

1. In a device of the character described, a cabinet provided with windows in its opposing walls, a plurality of movable frames adapted for the display of photographs or the like placed back to back in said frames, means for guiding said frames vertically and transversely within the cabinet, whereby they may be delivered to the respective windows in the opposing walls of the cabinet, means adapted to urge the passage of the frames from one wall to the opposite wall of the cabinet, means adapted to remove the frame adjacent the window in one wall of the cabinet while the movement of the frame adjacent the window in the opposing wall of the cabinet is momentarily suspended due to the alternate operation of the means for shifting the frames, and manually operated means for actuating said last named means.

2. In a device of the character described; a cabinet provided with windows in its opposing walls; a plurality of movable frames adapted to receive photographs or the like placed back to back in the frame for display through the windows of the cabinet, said frames being fitted with a plurality of rolls extending from its side walls into suitable grooves for guiding the frames vertically to and from the windows and transversely from one side of the cabinet to the opposite side thereof; springs adapted to bear upon the frames to urge their movement from one side of the cabinet to the other; and a pair of vertically movable blocks slidable in suitable guide-ways, adapted to engage the movable frames adjacent to the outer walls of the cabinet whereby the respective frames may be alternately shifted in opposite directions or to the windows in one wall of the cabinet and from the windows in the opposing wall of the cabinet.

3. In a device of the character described; a cabinet having windows in each of its opposing walls; a plurality of frames, having an opening on each side, whereby photographs or the like may be viewed from each side of the frame; means for guiding said frames vertically and laterally in superimposed tiers, whereby they may be shifted from the windows in one wall of the cabinet to the windows in the opposing wall of the cabinet and back again to the first named windows; springs for urging the frames in the respective tiers in opposite directions; oscillating means, adapted upon each alternate oscillation to force the frame adjacent one wall of the cabinet in the lower tier upwardly and simultaneously therewith the frame in the upper tier adjacent the opposite wall of the cabinet downwardly, the movement of the respective frames while opposite the windows being thereby suspended during the alternate oscillation of the oscillating means, and means for actuating said oscillating means.

4. In a device of the character described, a cabinet provided with openings, racks adapted to receive matter to be displayed slidably mounted within the same, vertical and horizontal guide ways within the cabinet provided with vertical and horizontal passages and adapted to guide the said racks, means for urging the plates toward the openings, and means for simultaneously moving a plate from a position adjacent one of the openings and at the same time urging another plate to displaying position adjacent another opening.

5. In a device of the character described, a cabinet provided with openings, guide ways therein, racks slidably mounted on the guide ways and carrying matter to be displayed therein, springs for urging the racks toward the openings, vertically sliding blocks carried by guide rods within the cabinet provided with lugs adapted to engage the racks and move the same vertically, and means for operating the blocks.

6. In a device of the character described, a cabinet having openings therein, vertical and horizontal guides within the cabinet and carrying display racks thereon, springs for urging the racks toward the openings, vertically sliding blocks carried by guide rods provided with lugs adapted to engage the racks and move the same vertically, means for retracting the blocks to normal position and means for operating the same.

7. In a device of the character described, comprising a cabinet having superposed display openings therein in its opposing walls, guides adjacent each of the openings, racks adapted to contain matter to be displayed slidably mounted therein, means for shifting the racks to and away from the openings simultaneously, the said means comprising vertically sliding blocks having lugs thereon to engage the racks, a crank rod and a pitman rod for operating the blocks, the pitman rod adapted to limit the movement of the crank rod by contact therewith.

In testimony whereof, I sign this specification in the presence of two witnesses.

HARRY ROTH.

Witnesses:
S. E. THOMAS,
JOHN CONSIDINE.